(12) United States Patent
Boehm et al.

(10) Patent No.: US 11,619,238 B2
(45) Date of Patent: Apr. 4, 2023

(54) CENTRIFUGAL PUMP HAVING AN ARRANGEMENT FOR SEALING

(71) Applicant: KSB SE & Co. KGaA, Frankenthal (DE)

(72) Inventors: Alexander Boehm, Frankenthal (DE); Stephan Braun, Frankenthal (DE); Stephan Bross, Frankenthal (DE); Holger Rauner, Frankenthal (DE); Adrian Stein, Frankenthal (DE); Tim Richter, Neunkirchen-Seelscheid (DE)

(73) Assignee: KSB SE & Co. KGaA, Frankenthal (DE)

( * ) Notice: Subject to any disclaimer, the term of this patent is extended or adjusted under 35 U.S.C. 154(b) by 896 days.

(21) Appl. No.: 16/098,559

(22) PCT Filed: Apr. 25, 2017

(86) PCT No.: PCT/EP2017/059812
§ 371 (c)(1),
(2) Date: Nov. 2, 2018

(87) PCT Pub. No.: WO2017/190990
PCT Pub. Date: Nov. 9, 2017

(65) Prior Publication Data
US 2019/0136864 A1    May 9, 2019

(30) Foreign Application Priority Data

May 4, 2016    (DE) .................... 10 2016 207 775.9

(51) Int. Cl.
*F04D 29/16*    (2006.01)
*F04D 29/12*    (2006.01)
(Continued)

(52) U.S. Cl.
CPC .......... *F04D 29/167* (2013.01); *F04D 29/126* (2013.01); *F16J 15/44* (2013.01); *F04D 29/426* (2013.01)

(58) Field of Classification Search
CPC .... F04D 29/167; F04D 29/126; F04D 29/426; F04D 29/2294; F04D 29/4286;
(Continued)

(56) References Cited

U.S. PATENT DOCUMENTS 2,311,815 A * 2/1943 Briney, Jr. .............. F16C 31/04
384/520
2,604,050 A * 7/1952 Wilson .................. F04D 29/167
415/174.2
(Continued)

FOREIGN PATENT DOCUMENTS

CN    203476784 U    3/2014
DE    24 23 904 A1    2/1975
(Continued)

OTHER PUBLICATIONS

ChrisVahi. Caged Ball Bearing, https://www.thingiverse.com/thing:745953 (Year: 2015).*
(Continued)

*Primary Examiner* — Topaz L. Elliott
(74) *Attorney, Agent, or Firm* — Crowell & Moring LLP

(57) ABSTRACT

A sealing arrangement for a centrifugal pump is provided. The sealing arrangement permits a sealing gap between a rotating element such as a pump impeller and a non-rotating element such as a pump casing to be minimized, while protecting against element wear from gap reduction and element contact, particularly during transient operation such as pump start up. At least one of the rotating element and the non-rotating element is provided with a plurality of movably mounted bodies configured to rotate and maintain separate (Continued)

the rotating and non-rotating elements when the sealing gap is reduced. The elements and the bodies may be formed in an additive manufacturing process.

10 Claims, 6 Drawing Sheets

(51) Int. Cl.
  *F04D 29/42* (2006.01)
  *F16J 15/44* (2006.01)
(58) Field of Classification Search
  CPC ........ F04D 5/008; F04D 29/04; F04D 29/049;
    F04D 29/059; F04D 29/122; F04D
    29/2266; F04D 29/622; F04D 29/162;
    F04D 29/4206; F16J 15/44; F05D
    2230/30; F05D 2240/54; F05D 2260/972
  USPC ............ 415/126, 127, 128, 140, 141, 172.1,
    415/173.1, 173.3, 173.4, 173.6, 174.2,
    415/174.4, 229, 168.2
  See application file for complete search history.

(56) References Cited

U.S. PATENT DOCUMENTS

| | | | | |
|---|---|---|---|---|
| 3,405,434 | A * | 10/1968 | Hoffman | F16C 33/60 |
| | | | | 29/898.063 |
| 3,539,115 | A * | 11/1970 | Woods | B02C 15/08 |
| | | | | 241/46.15 |
| 4,353,605 | A * | 10/1982 | Chiba | F16C 33/7809 |
| | | | | 277/423 |
| 4,362,480 | A * | 12/1982 | Suzuki | F04C 11/008 |
| | | | | 418/152 |
| 4,451,213 | A * | 5/1984 | Takei | F04D 5/002 |
| | | | | 415/106 |
| 4,911,610 | A * | 3/1990 | Olschewski | F04D 29/049 |
| | | | | 415/170.1 |
| 5,158,440 | A * | 10/1992 | Cooper | F04D 13/064 |
| | | | | 417/423.1 |
| 5,207,557 | A * | 5/1993 | Smiley, III | F04D 29/287 |
| | | | | 384/42 |
| 5,588,754 | A * | 12/1996 | Miller | F16C 39/02 |
| | | | | 384/615 |
| 6,926,493 | B1 * | 8/2005 | Miyamoto | F04D 19/042 |
| | | | | 415/143 |
| 7,484,734 | B2 | 2/2009 | Anderberg | |
| 8,382,423 | B1 * | 2/2013 | Frodis | A61B 17/3201 |
| | | | | 415/83 |
| 9,284,851 | B2 * | 3/2016 | Takaoka | F01D 17/162 |
| 9,458,848 | B2 * | 10/2016 | Dreiman | F04C 18/0215 |
| 10,385,850 | B2 * | 8/2019 | Pawlik | F04C 2/3566 |
| 2003/0007709 | A1 * | 1/2003 | Schweigler | B29C 48/535 |
| | | | | 384/619 |
| 2007/0160467 | A1 | 7/2007 | Lienau et al. | |
| 2012/0063918 | A1 * | 3/2012 | de Larminat | F16C 32/0442 |
| | | | | 417/1 |
| 2012/0156012 | A1 | 6/2012 | Villoria | |
| 2016/0281715 | A1 * | 9/2016 | Tuckey | F01C 21/0809 |
| 2017/0096847 | A1 * | 4/2017 | Liu | E05D 3/02 |

FOREIGN PATENT DOCUMENTS

| | | | | |
|---|---|---|---|---|
| DE | 35 13 116 | A1 | 10/1986 | |
| DE | 35 30 986 | A1 | 3/1987 | |
| DE | 86 21 532 | U1 | 12/1987 | |
| DE | 90 01 229 | U1 | 4/1990 | |
| DE | 102017110017 | A1 * | 11/2018 | |
| EP | 0 681 658 | B1 | 12/1996 | |
| ER | 2 466 149 | A1 | 6/2012 | |
| FR | 1 527 552 | | 5/1968 | |
| FR | 2 594 184 | A1 | 8/1987 | |
| JP | 54-137661 | U | 9/1979 | |
| JP | 62-117048 | U | 7/1987 | |
| JP | 2004-52916 | A | 2/2004 | |
| JP | 2008038978 | A * | 2/2008 | ............. F16C 19/06 |
| JP | 2014-231827 | A | 12/2014 | |
| WO | WO 2015/035625 | A1 | 3/2015 | |

OTHER PUBLICATIONS

MakerBot. Musical Instruments Collection: Tambourine, https://www.thingiverse.com/thing:529115 (Year: 2014).*

International Preliminary Report on Patentability (PCT/IB/338 & PCT/IB/373) and English translation of the Written Opinion (PCT/ISA/237) issued in PCT Application No. PCT/EP2017/059812 dated Nov. 15, 2018 (eight (8) pages).

Chinese-language Office Action issued in counterpart Chinese Application No. 201780027548.7 dated Oct. 11, 2019 with English translation (16 pages).

Japanese-language Office Action issued in counterpart Japanese Application No. 2018-555907 dated Nov. 19, 2019 with English translation (nine pages).

International Search Report (PCT/ISA/210) issued in PCT Application No. PCT/EP2017/059812 dated Aug. 11, 2017 with English translation (six (6) pages).

German-language Search Report issued in counterpart German Application No. 10 2016 207 775.9 dated Feb. 22, 2017 with partial English translation (nine (9) pages).

* cited by examiner

CENTRIFUGAL PUMP HAVING AN ARRANGEMENT FOR SEALING

CROSS REFERENCE TO RELATED APPLICATIONS

This application is a National Phase Application of PCT International Application No. PCT/EP2017/059812, filed Apr. 25, 2017, which claims priority under 35 U.S.C. § 119 from German Patent Application No. 10 2016 207 775.9, filed May 4, 2016, the entire disclosures of which are herein expressly incorporated by reference.

BACKGROUND AND SUMMARY OF THE INVENTION

The invention relates to a centrifugal pump having an arrangement for sealing, wherein a gap is formed between a rotating element and a non-rotating element.

Such an arrangement can for example be a split ring sealing arrangement. Split ring sealing in centrifugal pumps serve for sealing chambers of different pressures, wherein a rotating element is arranged in a partition between the chambers. In the case of the rotating element, it can be a shaft, a hub of an impeller, a suction nozzle of an impeller or the like. The arrangement comprises a non-rotating element and a rotating element. In the case of the non-rotating element, it can for example be a split ring which is arranged on the casing, or can be the casing itself or a casing part. In the case of the rotating element, it can for example be a rotating ring which is arranged on the impeller, or can be the impeller itself or a part of the impeller, for example the rear shroud of the impeller in the case of a closed impeller. The gap, which is formed between the rotating element and the non-rotating element, acts as a throttle between the chambers of different pressures and prevents an excessively large flow from the chamber of higher pressure into the chamber of lower pressure. The smaller the gap between the two elements is, the lower are the efficiency losses of the centrifugal pump. An obstacle to this aim, however, is the fact that a gap which is excessively small is very difficult to bring into line with the manufacturing tolerances and the operational influences. It is necessary to avoid contacts between the elements in order to prevent brushing of the rotating element against the non-rotating element and therefore in order to prevent wear. Due to the necessary tolerances during the production of the individual components, there is a minimum gap width which in particular prevents elements coming into contact with each other and therefore creating rubbing and wear. However, during operation, especially during starting and shutting down of the pump, situations in which contact happens and then compression or material wear occurs are frequently encountered.

EP 2 466 149 A1 describes a turbomachine for a fluid with a radial sealing gap which is formed between stator parts and a closed impeller. At the sealing gap provision is made for a wear ring which is arranged in a stationary manner, having an inner side which faces the impeller of the turbomachine, an outer side and two axially spaced apart lateral surfaces. Formed in the wear ring is a concentrically extending recess in the form of a radial gap or a radial incision.

Described in DE 35 30 986 A1 is a split ring seal for a centrifugal pump with a split ring which is fastened in the casing. A plurality of elastic elements are arranged between the sealing face of the split ring and the casing. As a result of these, damage to the rotating part is to be largely excluded.

EP 681658 B1 describes a centrifugal pump with a split ring seal, consisting of a split ring which is arranged in a rotation-resisting manner in a stationary casing part. A rotating component is located inside the split ring. A gap is formed between the split ring and the component which rotates inside it. Chambers of different pressure are provided on both sides of the gap. The face of the split ring which faces the rotating part is designed as a stationary polygonal split ring surface.

DE 35 13 116 A1 describes a wear-subjected ring seal which can be adjustable. As a result of this, the service life of a centrifugal pump can be increased despite wear.

It is the object of the invention to specify a centrifugal pump having an arrangement for sealing, in which a gap which is as small as possible is formed between a rotating element and a non-rotating element so that the pump has a level of efficiency which is as high as possible and the flow loss through the gap becomes as small as possible and at the same time wear phenomena between the elements are prevented. The centrifugal pump is to be distinguished by a long service life and maintenance cost which is as low as possible. Furthermore, the centrifugal pump is to be produced as inexpensively as possible and is to ensure a reliable mode of operation.

According to the invention, at least one element of the arrangement has bodies which are rotatably mounted. The bodies can be mounted either so that they can rotate around an axis or a plurality of axes or can be rotatable in any desired direction as in the case of the ball of a ballpoint pen. The bodies can either be arranged on the non-rotating element or on the rotating element. In principle, there is also the possibility that bodies are arranged both on the rotating element on the non-rotating element.

It proves to be particularly favorable if the arrangement for sealing is designed as a split ring sealing arrangement and the bodies are arranged on the non-rotating element which is designed as the split ring. Alternatively to this, there is also the possibility that in the case of the split ring sealing arrangement the non-rotating element is formed by the casing itself without a separate split ring being fastened on the casing and the bodies are rotatably mounted on the casing in a structure which is specifically designed for them.

If the arrangement is formed as a split ring sealing arrangement then the rotating element can be formed by a rotating ring which is arranged on the rear shroud of an impeller. Alternatively, the rotating element can also be formed by the impeller itself in this case, wherein the rotatably mounted bodies are for example rotatably mounted in the rear shroud of the impeller, wherein in this case the rear shroud of the impeller is provided with a structure which forms a support for the bodies.

The bodies are arranged in each case on the gap side so that in the case of a gap decreasing in size, as can occur for example during the starting or shutting down of the centrifugal pump, they can prevent brushing of the elements by means of rolling movement of the bodies and therefore wear phenomena can be effectively avoided.

The device according to the invention enables gap widths which are as small as possible to be set so that the centrifugal pump has a low leakage flow through the gap and therefore has a high degree of efficiency and at the same time wear phenomena can be effectively prevented since the rotatably mounted bodies reliably absorb friction forces and convert them into rotational movements.

It proves to be particularly favorable if the bodies are contained in a structure in a form-fitting manner so that on the one hand they are fixed in one chamber and at the same time a rotation of the bodies around themselves or around one or more axes is possible, as is the case for example with the ball of a ballpoint pen. In the case of the structure, it can be a separate component which is part of the element or the structure can be formed by the element itself, that is to say by the split ring or rotating ring or by the housing part or impeller for example. As a result of the form-fitting containment, the bodies are partially enclosed so that a part of the body projects beyond the structure toward the gap and a part of the body is arranged in a chamber which is formed by the structure and in this way the effect of the bodies being able to fall out of the structure is prevented.

The bodies can for example be designed as balls. In this case, it proves to be advantageous if these are rotatably mounted around one point in any direction.

Additionally or alternatively, the arrangement can also comprise bodies which are designed in the form of cylinders. The cylinders are preferably rotatably mounted around an axis, wherein a gap-side rolling over the generated surfaces of the cylinders is carried out, which cylinders at least partially project into the gap and in this way effectively prevent brushing of the elements against each other so that wear phenomena are avoided.

In one variant of the invention, the bodies are interconnected via pins. Therefore, for example a plurality of cylinders which in each case are connected via pins can be arranged in a row one behind the other. The pins are part of the rotational axis around which the cylinders rotate.

The structure into which the bodies are embedded can comprise honeycombs and/or cells which form cavities for receiving the bodies. In one variant of the invention, individual cells or honeycombs may also not be provided with bodies so that the element has honeycombs or cells which serve for gap loss minimization. The cells or honeycombs lead to favorable flow conditions in the gap so that gap loss minimization is achieved.

In one variant of the invention, the bodies are mounted so that they support the element both on the inner side and on the outer side. For example, for this purpose the element can be designed as a hollow cylinder and can have a structure which comprises cavities in which the bodies are arranged so that they project on the inner generated surface of the cylinder and on the outer generated surface of the cylinder and in this way the element can be supported both on its inner side and on its outer side by the rotational movements of the bodies.

In a particularly favorable variant of the invention, the respective element and the bodies which are mounted therein are formed from the same material. In this case, it proves to be advantageous if the element and the bodies are produced together in a generative process. Such generative manufacturing processes are also referred to as additive manufacturing processes. For example, selective laser melting and/or selective laser sintering can be used for this purpose.

In this case, the element with bodies arranged therein can be produced according to a process in which a layer of a build-up material is applied to a base. In the case of the build-up material for producing the element it is preferably metal powder particles. In one variant of the invention, ferriferous and/or cobaltiferous powder particles are used for this purpose. These can contain additives such as chromium, molybdenum or nickel. The metallic build-up material is applied in powder form to a plate in a thin layer. Then, the powder-form material is locally completely remelted by means of a beam at the respectively desired points and after solidification a solid material layer is formed. The base is then lowered by the amount of the layer thickness and powder is applied anew. This cycle is repeated until all the layers have been remelted and the finished element with the bodies rotatably mounted therein has been created. According to the invention, a structure which encompasses the bodies in a form-fitting manner is created in the process so that one part of the bodies projects into the sealing gap and one part of the bodies is arranged in a cavity structure so that these cannot fall out of the element.

As a beam, use can be made for example of a laser beam which generates the element from the individual powder layers. The data for guiding the laser beam is generated by means of software on the basis of a 3D-CAD-body. Alternatively to selective laser melting, an electron beam (EBM) can also be used.

The element with the bodies arranged therein which is generated in this way forms an arrangement for sealing a centrifugal pump, which arrangement is particularly low in respect to wear and in which very small gap sizes can be accepted without wear occurring.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
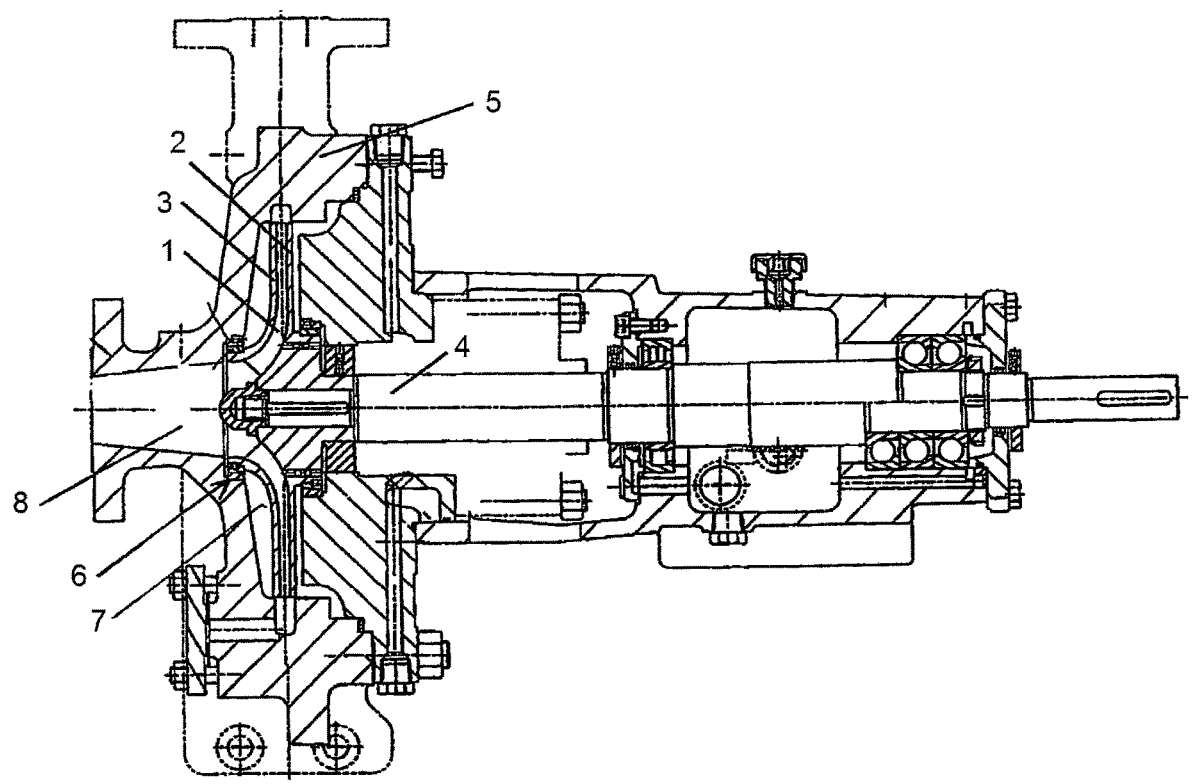
FIG. 1 shows a sectional view through a centrifugal pump in accordance with an embodiment of the present invention.

FIG. 1 shows a centrifugal pump with an impeller 1. The impeller 1 is designed as a closed radial impeller and has a support disk 2 and a rear shroud 3. Blades are arranged on the support disk 2. Passages for the transporting of the medium are formed between the support disk 2 and the rear shroud 3. The impeller 1 is driven by a shaft 4 and is enclosed by a casing 5.

The centrifugal pump has an arrangement 6 for sealing which separates a chamber 7 with a higher pressure from a chamber 8 with a lower pressure. The chamber 7 is formed in this embodiment by the second chamber of the impeller 1. The chamber 8 forms a suction side of the centrifugal pump. In the case of the arrangement 6, in this embodiment it is a split ring sealing arrangement which has a radial sealing gap.

Figure 2:
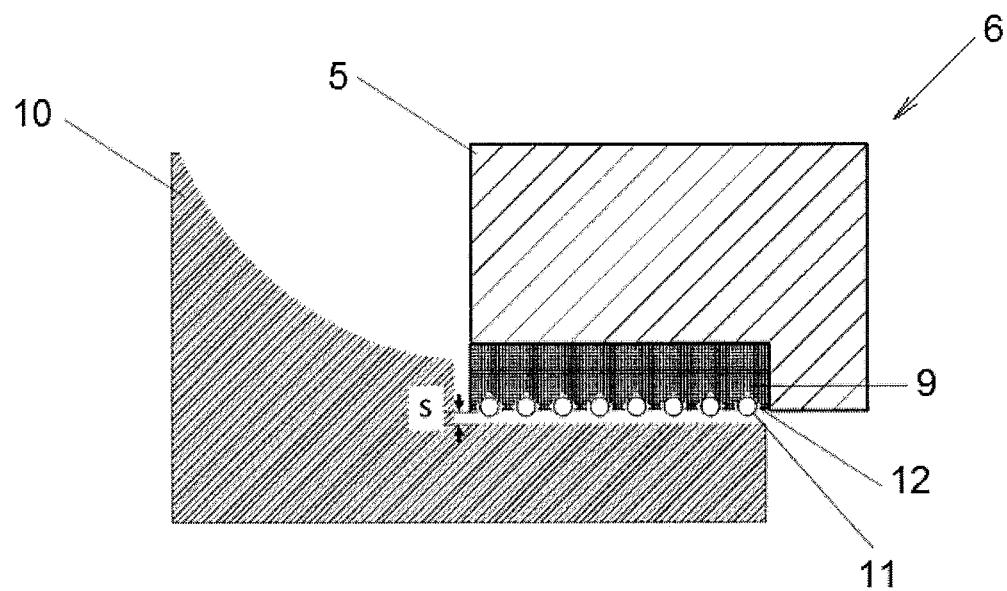
FIG. 2 shows a schematic view of an arrangement for sealing in accordance with an embodiment of the present invention.

FIG. 2 shows a schematic view of an arrangement 6 for sealing. The arrangement has a non-rotating element 9 which in the view according to FIG. 2 is formed by a split ring which is arranged on the casing 5. Alternatively to the view according to FIG. 2, the non-rotating element 9 can also be formed by the casing 5 itself. Furthermore, the arrangement 6 has a rotating element 10. The rotating element 10 in the embodiment according to FIG. 2 is formed by the rear shroud of the impeller, that is to say by the impeller itself. Alternatively to the view according to FIG. 2, a rotating ring can also be arranged on the rear shroud of the impeller. A gap S is formed between the non-rotating element 9 and the rotating element 10. In the case of the gap S, it is a radial sealing gap. In order minimize as far as possible a fluid flow from the chamber with the higher pressure to the chamber with the lower pressure this gap S should be as small as possible.

According to the invention, the arrangement 6 has bodies 11 which in the embodiment according to FIG. 2 are arranged on the non-rotating element 9. To this end, the non-rotating element 9 has a structure 12 in which the bodies 11 are rotatably mounted.

The structure 12 is created so that the bodies 11 are embedded therein a form-fitting manner so that a part of the bodies 11 is arranged in a cavity which is formed by the structure 12 and a part of the bodies 11 project toward the gap S. The bodies 11 prevent the effect of wear phenomena occurring between both elements 9, 10 by rolling movements of the non-rotating element 9 on the rotating element 10. In the embodiment according to FIG. 2, the bodies 11 are designed as movable balls.

Figure 3:
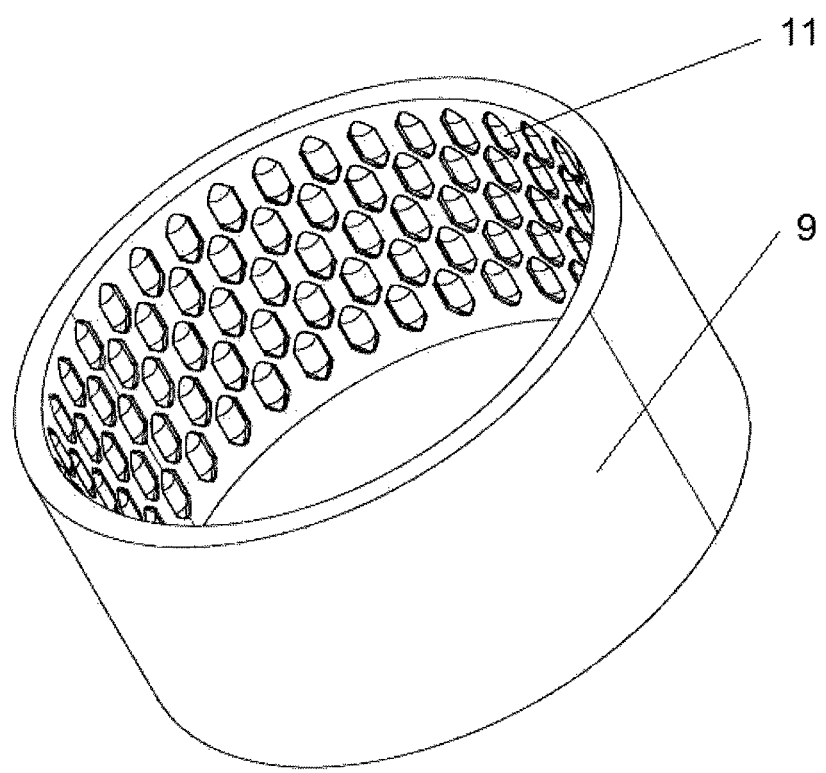
FIG. 3 shows a variant with cylindrical bodies in accordance with an embodiment of the present invention.

FIG. 3 shows a variant in which the bodies are designed as movable rollers. According to the view in FIG. 3, the bodies 11 are arranged in a non-rotating element 9 which is designed as a split ring which has a structure which forms cavities so that the bodies are contained in the cavities in a form-fitting manner and at the same time a part of the bodies projects into the gap and therefore enables a rolling movement of the bodies. In the embodiment according to FIG. 3, the bodies have a cylindrical section and roll along its generated surface. The bodies which are designed as rollers rotate around an axis. Instead of rollers, individual places can have a honeycomb or a cell structure which serves for gap loss minimization.

Figure 4:
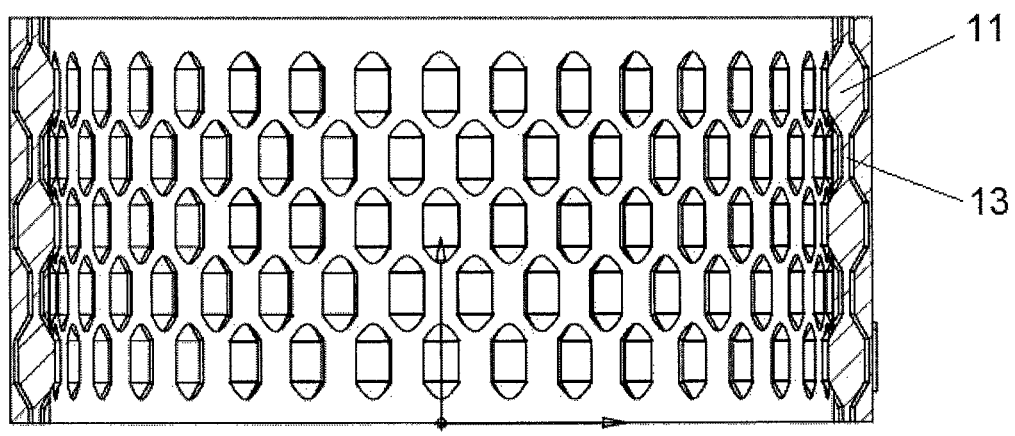
FIG. 4 shows a variant in which the bodies are interconnected in accordance with an embodiment of the present invention.

FIG. 4 shows a variant in which the movable rollers are interconnected via pins 13. Therefore, a plurality of bodies which are designed as rollers are interconnected via the pins 13 in a rotation-resistant manner. The pins 13 are also arranged in cavities of the structure 12.

Figure 5:
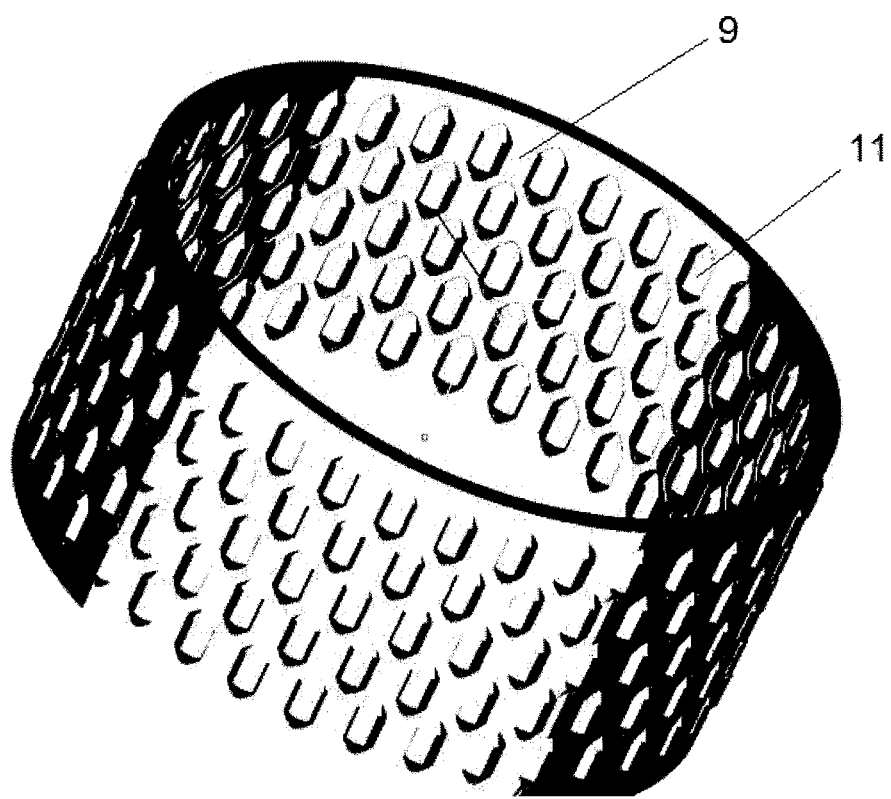
FIG. 5 shows a variant in which the bodies have a running surface both on the inside and on the outside in accordance with an embodiment of the present invention.

FIG. 5 shows an embodiment in which the bodies have a running surface both on the inside and on the outside. Also in the view according to the FIG. 5, the bodies 11 are arranged in a non-rotating element 9 which is designed as a split ring, wherein the structure is selected so that the bodies are contained in a form-fitting manner but project both on the inner generated surface and on the outer generated surface of the split ring.

Figure 6:
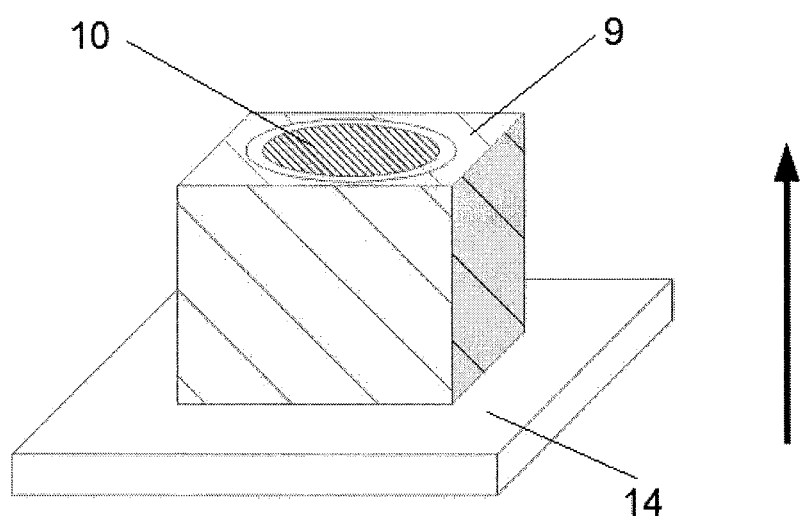
FIG. 6 shows a schematic view of a creation of the arrangement by a generative process in accordance with an embodiment of the present invention.

FIG. 6 shows a schematic view of a build-up for a method for producing an arrangement for sealing in a centrifugal pump. A build-up material in the form of a metallic powder is applied to a base 14. The powder-form material is locally completely remelted by radiation at the respective desired points and after solidification forms a solid material layer. The base 14 is then lowered by the amount of a layer thickness and powder is deposited anew. This cycle is repeated until all the layers have been remelted. In this way, it is possible to form both the non-rotating element 9 and the rotating element 10 in one generative process, wherein according to the invention at least one element has bodies 11 which are movably mounted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sealing arrangement for a centrifugal pump, comprising:
    a rotating element of the pump;
    a non-rotating element of the pump, the non-rotating element being arranged in the pump with a sealing gap formed between the rotating element and the non-rotating element, and the sealing gap separating a higher pressure chamber of the pump from a lower pressure chamber of the pump in a direction parallel to a rotation axis of the rotating element; and
    a plurality of movably mounted bodies at a sealing gap side of one or both of the rotating element and the non-rotating element, the plurality of bodies having a generated surface for rolling,
    wherein
        the plurality of bodies are configured to prevent wear of one or both of the rotating and non-rotating elements by a rolling movement of the plurality of bodies when the sealing gap decreases in size radially due to relative motion between the rotating element and the non-rotating element,
        when contact occurs between the plurality of bodies and the one or both of the rotating and non-rotating elements, the contact is direct contact between the plurality of bodies and the one or both of the rotating and non-rotating elements, and
        in a rest state in which the rotating element is not rotating, a portion of the rotating element radially facing the plurality of bodies does not radially overlap the plurality of bodies.

2. The sealing arrangement as claimed in claim 1, wherein the plurality of bodies are embedded in a structure in a form-fitting manner.

3. The sealing arrangement as claimed in claim 2, wherein the plurality of bodies are balls.

4. The sealing arrangement as claimed in claim 2, wherein the plurality of bodies have a cylindrical section.

5. The sealing arrangement as claimed in claim 1, wherein the plurality of bodies are arranged on the non-rotating element, and
    the non-rotating element is a split ring.

6. The sealing arrangement as claimed in claim 1, wherein one or both of the rotating and non-rotating elements includes one or both of gap loss minimization honeycombs and gap loss minimization cells.

7. The sealing arrangement as claimed in claim 1, wherein the rotating and non-rotating elements and the plurality of bodies are formed from the same material.

8. The sealing arrangement as claimed in claim 7, wherein the rotating and non-rotating elements and the plurality of bodies are formed together in a generative process.

9. The sealing arrangement as claimed in claim 1, wherein the plurality of bodies are interconnected by pins.

10. The sealing arrangement as claimed in claim 1, wherein the plurality of bodies support one or both of the rotating element on one or both of an inner side and on an outer side of the rotating element and the non-rotating element on one or both of an inner side and on an outer side of the non-rotating element.

* * * * *